(12) United States Patent
Alfayad et al.

(10) Patent No.: US 8,403,081 B2
(45) Date of Patent: Mar. 26, 2013

(54) FOOT FOR HUMANOID ROBOT

(75) Inventors: Samer Alfayad, Bourg la Reine (FR); Fathi Ben Ouezdou, Bourg la Reine (FR); Fayçal Namoun, Courbevoie (FR)

(73) Assignee: BIA, Conflans Ste Honorine (FR)

( * ) Notice: Subject to any disclaimer, the term of this patent is extended or adjusted under 35 U.S.C. 154(b) by 0 days.

(21) Appl. No.: 12/996,474

(22) PCT Filed: Jun. 5, 2009

(86) PCT No.: PCT/EP2009/056965
§ 371 (c)(1),
(2), (4) Date: Mar. 9, 2011

(87) PCT Pub. No.: WO2009/147243
PCT Pub. Date: Dec. 10, 2009

(65) Prior Publication Data
US 2011/0186362 A1    Aug. 4, 2011

(30) Foreign Application Priority Data
Jun. 5, 2008 (FR) .................... 08 53713

(51) Int. Cl.
*B62D 57/02* (2006.01)
*B62J 19/00* (2006.01)
(52) U.S. Cl. ............................ 180/8.1; 901/1
(58) Field of Classification Search ........... None
See application file for complete search history.

(56) References Cited

U.S. PATENT DOCUMENTS

| | | | |
|---|---|---|---|
| 5,455,497 A | 10/1995 | Hirose et al. | |
| 6,741,911 B2 * | 5/2004 | Simmons | 700/245 |
| 2009/0146600 A1 * | 6/2009 | Kim et al. | 318/568.12 |

FOREIGN PATENT DOCUMENTS

| | | |
|---|---|---|
| EP | 1736285 A1 | 12/2006 |
| JP | 2006051585 A | 2/2006 |

OTHER PUBLICATIONS

Nishiwaki K et al: "Toe joints that 1,3,10 enhance bipedal and fullbody motion of . humanoid robots," Proceedings 2002 IEEE International Conference on Robotics and Automation, (Cat. No. 02CH37292) IEEE Piscataway, NJ, USA, vol. 3, May 2002, pp. 3105-3110 vol. , XP002537738 DOI: 10.1S24/1tit.2007.49.4.218 ISBN: 0-7803-7272-7.
Sven Behnke: "Human-Like Walking using Toes Joint and Straight stance Leg," Proceedings of the 3rd International Symposium on Adaptive Motion in Animals and Machines (AMAM2005), Ilmenau, Germany, [Online] Sep. 25, 2005.

(Continued)

*Primary Examiner* — Tony Winner
(74) *Attorney, Agent, or Firm* — Baker & Hostetler LLP

(57) ABSTRACT

A foot for a humanoid robot includes a sole having an upright secured thereto, toes, a motorized connection, independent of the ankle, in rotation between the sole and the toes, wherein the toes are able to move on an angular travel about an axis of the connection, an actuator formed of a linear jack coupled to the upright and the toes, allowing the connection to be motorized, and means for controlling the actuator in a standalone manner. The foot is of particular utility in the production of humanoid robots coming as close as possible to the human morphology.

9 Claims, 4 Drawing Sheets

OTHER PUBLICATIONS

Heinz Ulbrich—Institut De Mecanique Appliquee—Universite Technique De Munich: "Lola—Entwicklung and Realisierung zweibeiniger Roboter inspiriert nach dem menschlichen Vorbild", Script De L'Expose Du Professeur H. Ulbrich Lors Du 3EME Forum Pour La Mobilite, Seefeld, Allemagne i [Online] Sep. 24, 2008, XP002537740.

Jungwon Yoon et al: "A Novel 4-DOF Robotic Foot Mechanism with Multi-platforms for Humanoid Robot (SICE-ICCAS 2006)" SICE-ICCA,S 2006 International Joint Conference Oct. 1, 2006, pp. 3500-3504, XP031050125.

Liquan Wang et al: "Research on Biped Robot Gait in Double-support Phase" Mechatronics and Automation, 2007. ICMA 2007. International Conference ~N, IEEE, PI, Aug. 1, 2007, pp. 1553-1558, XP031134976.

* cited by examiner

FOOT FOR HUMANOID ROBOT

CROSS-REFERENCE TO RELATED APPLICATIONS

This application is a National Stage of International patent application PCT/EP2009/056965, filed on Jun. 5, 2009, which claims priority to foreign French patent application No. FR 08 53713, filed on Jun. 5, 2008, the disclosures of which are incorporated by reference in their entirety.

FIELD OF THE INVENTION

The invention relates to a foot and a humanoid robot using the foot. The invention is of particular utility in the production of humanoid robots coming as close as possible to the human morphology.

BACKGROUND OF THE INVENTION

A mathematical model describing this morphology was developed in the 1960s in the United States by Aerospace Medical Research Laboratories in Dayton, Ohio. This model, well known as the Hanavan model, describes parametrically, with respect to given human height and weight, the dimensions of all the parts of the body. Usually, the foot is described as having a sole and toes connected together by means of a joint with a degree of freedom in rotation in a sagittal plane of the foot.

For example, for a 14-year-old adolescent, 1.6 m tall and weighing 50 kg, the foot consists of an assembly of rectangular parallelepipeds. The total length of the foot is 243 mm, the width is 80 mm, the height of the heel is 62 mm and the distance between the back of the foot and the connection of the toes is 207 mm.

Currently, many humanoid robots have been developed, but none of them complies with the Hanavan model. In addition, the known robots have broad and solid feet, either with no mobility or with a passive mobility at the toes. Such feet degrade the fluidity of the gait of the robot and distance it substantially from the way of walking of the human being.

A dynamic calculation shows that to achieve a walk at a speed of 1.2 m/s, still for a robot of 1.6 m and 50 kg, the connection of the foot between sole and toes requires a torque of the order of 20 N·m, with a power of 30 W, and a range of movement from 0° to +60°.

SUMMARY OF THE INVENTION

The invention provides an improved match between the production of a robot and the human anatomy, for example modeled on the Hanavan model. The invention further provides improved fluidity of the movements of the robot when it walks but without reproducing a complex modeling of the human foot.

The invention includes a foot of which the toes are able to move relative to the sole. The invention also includes application of a torque to the connection between the toes and the sole, without this torque being dependent on the angular travel of the toes in their rotary movements. Specifically, applying such a torque to the connection between the toes and the sole improves the propulsive phase of the foot of the robot in order to come closer to that provided by the human foot, in order to improve the fluidity of the gait of the robot.

Accordingly, the invention includes a foot for a humanoid robot, that can be connected to a leg by means of an ankle, the foot including:
a sole,
toes,
a motorized connection, independent of the ankle, in rotation between the sole and the toes, the toes being able to move on an angular travel about an axis of the connection,
an actuator allowing the connection to be motorized, and and means for controlling the actuator in a standalone manner.

The invention further includes a humanoid robot having at least one foot described herein.

Attempts have been made to apply to the toes a torque dependent on their angular travel. This torque is applied by means of a spring such as for example a torsion spring placed in the connection between the toes and the sole. It has been found that such a torque did not give significant results with respect to improving the propulsive phase of the foot.

BRIEF DESCRIPTION OF THE DRAWINGS

The invention will be better understood and other advantages will appear on reading the detailed description of an embodiment given as an example, which description being illustrated by the appended drawing in which.

DETAILED DESCRIPTION

For the purposes of clarity, the same elements will bear the same reference numbers in the various figures.

Figure 1:
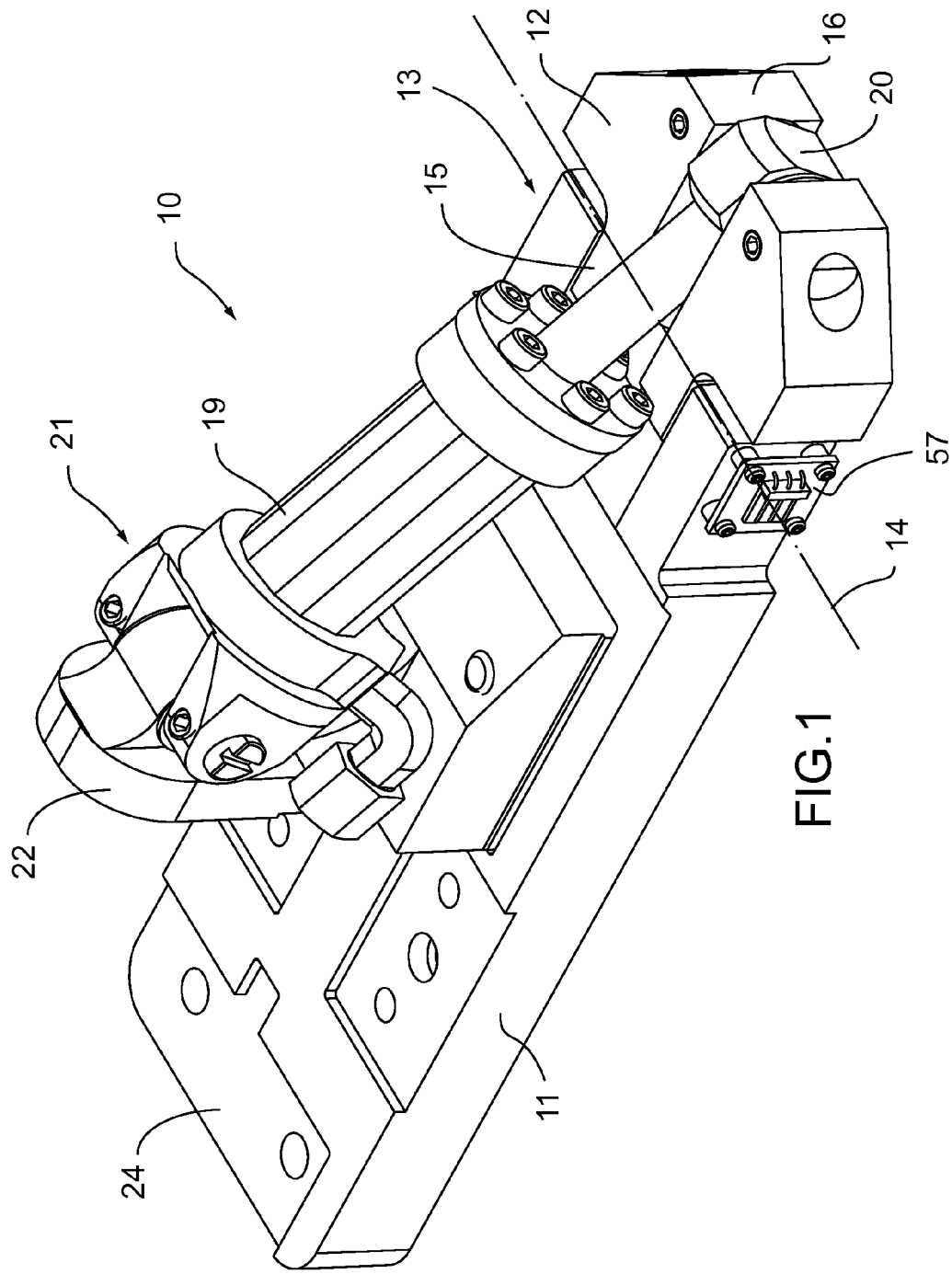
FIG. 1 represents in perspective a foot according to the invention.
Figure 2:
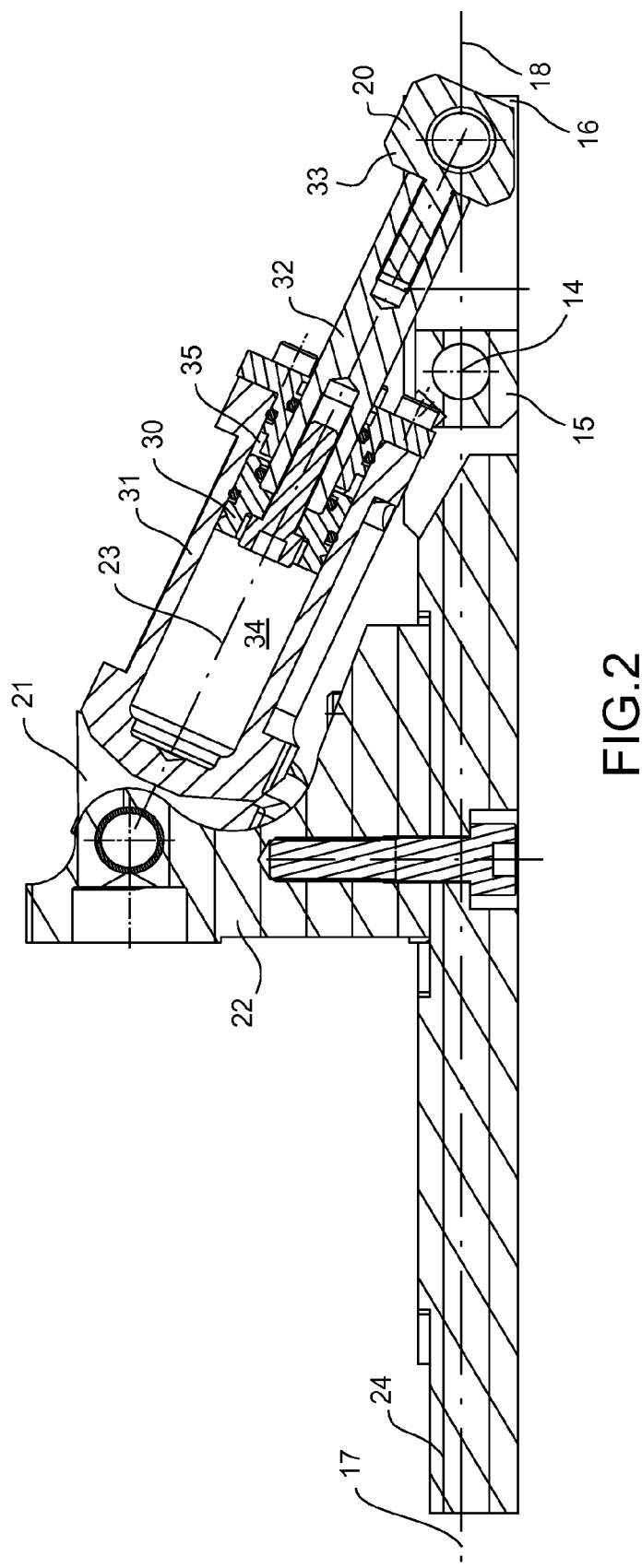
FIG. 2 represents the foot in section in a sagittal plane.
Figure 3:
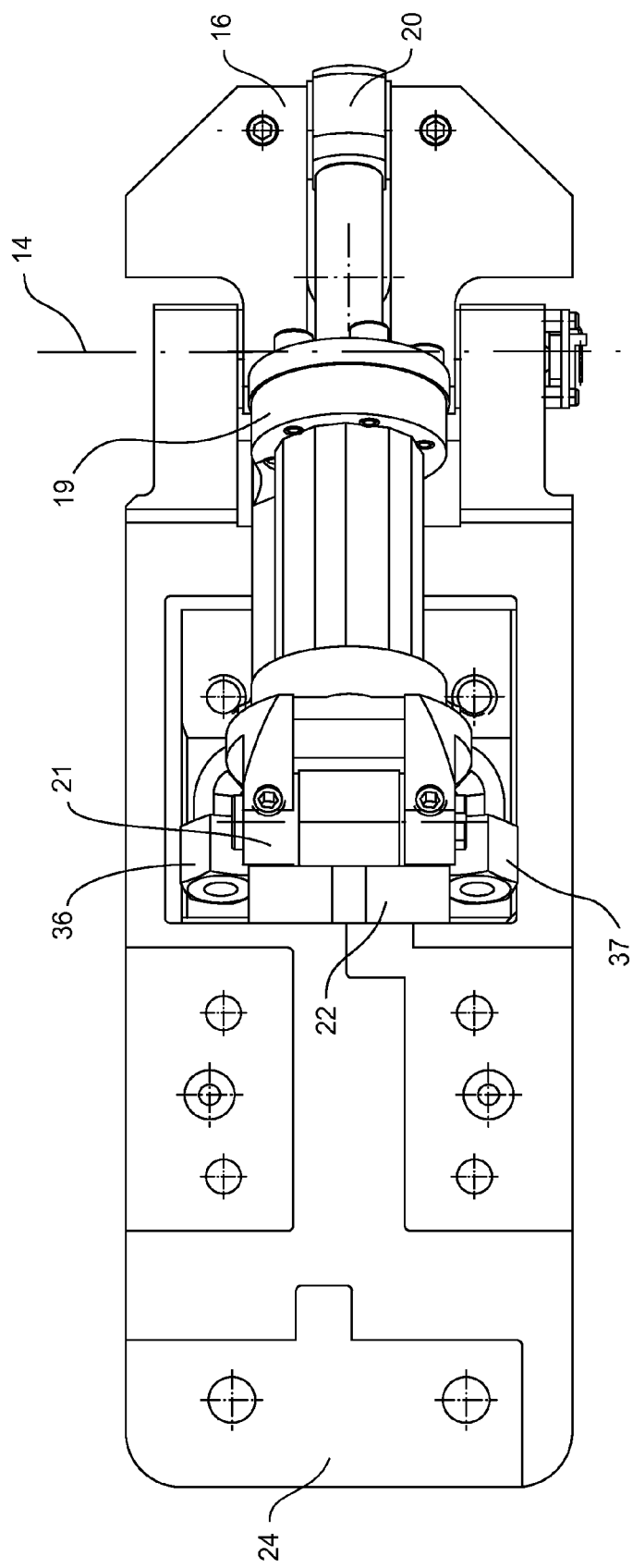
FIG. 3 represents the foot 10 in a top view.

FIG. 1 represents a foot 10 comprising a sole 11 and toes 12 articulated relative to the sole 11 by means of a connection 13 having a degree of freedom in rotation in a sagittal plane of the foot 10 about an axis 14. In the example shown, the toes 12 are secured together and are made of a one-piece mechanical part. The toes have two ends 15 and 16. The end 15 is situated on the axis 14 and the end 16 forms the tip of the foot 10. The connection 13 allows the toes to move with an angular range of movement of approximately 60° about the axis 14. FIG. 1 shows the toes 12 in a first extreme position in their rotary movement about the axis 14. In this position, the toes 12 are in line with the sole 11. In other words, the sole extends mainly on a plane 17 and an axis 18 passing through the two ends 15 and 16 is situated in the plane 17 of the sole 11. FIG. 2 shows the foot 10 in section in a sagittal plane perpendicular to the plane 17 and FIG. 3 shows the foot 10 in a top view.

A second extreme position of the toes 12 is reached when the toes 12 are raised to the maximum, in other words when the axis 18 containing the two ends 15 and 16 makes an angle of 60° with the plane 17 of the sole 11.

When a robot walks fitted with feet 10 comprising articulated toes 12, it is possible to use a damper as an actuator. Such an actuator applies to the toes 12 a torque which does not depend on the angular travel of the toes 12 but on their angular speed. Usually, the greater the angular speed, the greater the torque applied by the damper. The use of a damper makes it possible to vary the torque applied to the connection 13 as a function of the speed at which the robot moves when walking. When the robot runs, a damper makes it possible to apply to the connection a greater torque than when it walks. It is of course possible to supplement the torque exerted by the damper with a torque purely proportional to the travel.

The actuator can also be a motor in order to apply a driving torque to the connection 13. This torque makes it possible to move the toes 12 from the second extreme position to the first extreme position. This torque, applied to the toes 12, improves the propulsion of the robot generated by the foot 10 and reduces the energy necessary for walking by approximately 30%.

More generally, the foot comprises means for controlling the actuator 19 in a standalone manner, that is to say independently of any other joint of the robot. For example, the movements of the connection 13 are independent of the movements of the ankle of the robot or of the walking phase of the robot. The means for controlling the actuator 19 make it possible to choose a state from:

a complete rigidity of the connection 13, a restoring torque that is a function of the angular travel of the connection 13, a damping of the rotation of the connection 13, an addition of power during the rotation of the connection 13.

It is possible to achieve this motorization by means of a rotary motor acting between the sole 11 and the toes 12 at the connection 13. This type of motor might depart from the space requirement defined by the Hanavan model. Another alternative consists in producing this motorization by means of a linear jack 19 resting at one of its ends 20 on the toes 12 at their end 16 and at another of its ends 21 on an upright 22 secured to the sole 11. The upright 22 stands perpendicular to the plane 17 of the sole 11.

The bearing surface of the jack 19 on the upright 22 is situated above a plane 17 in which the sole 11 extends mainly so as to keep convergent the axis 23 of the jack 19 and the axis 18 linking the connection 13 and the bearing surface of the jack 19 on the toes 12. In other words, the end 21 of the jack 19 is coupled to the upright 22 in its top portion above the plane 17 in order to prevent the axis 18 being in line with an axis 23 of the jack, the axis joining the ends 20, 21 irrespective of the position of the toes 12 when they move. Such an alignment would prevent the application of a torque to the connection 13. The height of the upright 22 must nevertheless be limited in order to reduce the volume of the foot 10.

The inclination of the jack 19 relative to the plane of the sole 11 also allows an angular range of movement of the toes 12 that can extend on either side of the plane of the sole 11. More precisely, the angular range of movement mainly makes it possible to raise the toes 12 relative to the plane of the sole 11. The inclination of the jack 19 also makes it possible to slightly lower the toes 12 below the plane of the sole 11. Even without lowering the toes 12, this inclination of the jack 19 makes it possible to increase the torque applied by the jack 19 to the toes 12. This range of movement makes it possible to improve the propulsive phase of the gait of the robot.

The sole 11 extends from a heel 24 to the connection 13 situated at the front of the sole 11. The upright 22 is attached toward the front of the sole 11, thus freeing up the rear of the sole 11 making it possible to attach thereto an ankle of the robot, not shown.

The jack 19 may be electric, it may also be actuated by a hydraulic fluid. Accordingly, the jack 19 comprises a piston 30 that can move in a cylinder 31 on the axis 23. The piston 30 is secured to a rod 32 attached to a yoke 33 forming the end 20 of the jack 19. Inside the cylinder 31, the piston 30 delimits two chambers 34 and 35 which the hydraulic fluid can enter under pressure via connectors, respectively 36 and 37. A difference in pressure between the chambers 34 and 35 makes it possible to move the rod 32 so as to move the toes 12. Seals are used to seal the chambers 34 and 35. The toes 12 are raised or lowered as a function of the sign of the difference in pressure between the chambers 34 and 35. The hydraulic fluid supplying the two chambers 34 and 35 may be supplied by a pump on board the robot. When the robot comprises several actuators, notably for its two feet, it is possible to provide a dedicated pump for each actuator.

In the variant in which the actuator is reduced to a damper, it is possible to use a damper similar to the jack 19 without external hydraulic supply. The two chambers 34 and 35 are then connected via a calibrated channel allowing the fluid to pass from one chamber to the other. It is possible to place a spring in one of the chambers 34 or 35 in order to bring the toes 12 into line with the sole 11. The damping function may also be achieved by calibrating a flow rate of fluid passing from one chamber to the other through the pump. In this case, the control of the pump makes it possible to use the jack 19 either as a motor or as a damper as required. It will therefore advantageously be possible to vary the damping parameters for example while the robot is walking. In a more general manner, the same actuator may have a damping function or a motor function, these two functions being able to be combined.

In order to ensure an anthropomorphic gait, the thrust of the jack 19 in extension is crucial. It is possible to achieve the motorization with the aid of a single-acting jack in which only the chamber 34 is capable of being supplied with pressurized fluid. In order to ensure the return movement of the jack, a spring is then placed in the chamber 35 which is kept at atmospheric pressure.

The ends 20 and 21 of the jack 19 are articulated respectively relative to the toes 12 and relative to the upright 22. Each joint has a degree of freedom in rotation about axes parallel to the axis 14.

Figure 4:
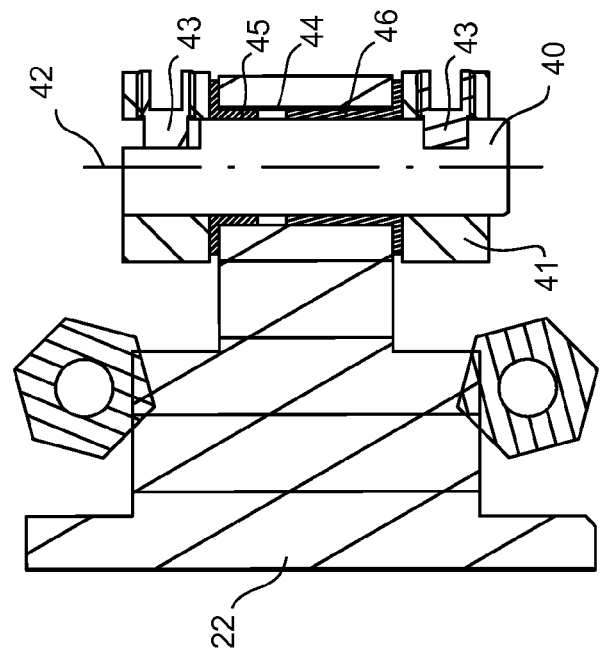
FIG. 4 represents the articulation of a jack relative to a sole.

FIG. 4 represents the joint of the jack 19 relative to the upright 22. This joint comprises a shaft 40 secured to a fork 41 of the jack 19. The fork 41 forms the end 21 of the jack 19. The shaft 40 extends on an axis 42 parallel to the axis 14. The shaft 40 is attached to the fork 41 for example by means of screws 43. The shaft 40 can pivot inside a bore 44 of axis 42 made inside the upright 22. It is possible to place bearings 45 and 46 between the bore 44 and the shaft 40 in order to reduce the friction when the shaft 40 rotates in the bore 44. The fork 41 prevents any translation of the jack 19 relative to the upright 11 on the axis 42.

Figure 5:
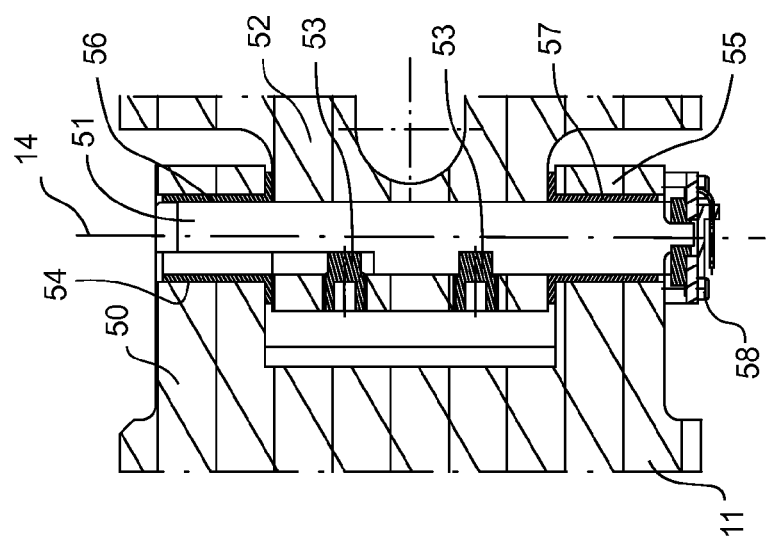
FIG. 5 represents the articulation of the toes relative to the sole.

FIG. 5 represents the joint of the toes 12 relative to the sole 11. This articulation, forming the connection 13, can be produced like the joint of the jack 19 on the upright 22. The sole 11 comprises a fork 50. A shaft 51 of axis 14 is attached to a yoke 52 belonging to the toes 12 by means of screws 53. The shaft 51 can slide in bores 54 and 55 of the fork 50. Bearings 56 and 57 can be inserted between the shaft 51 and the bores, respectively 54 and 55.

To measure the angular position of the toes 12 about the axis 14, it is possible to place at the bearing 57 a potentiometer 58 delivering an item of electrical information as a function of the angular position of the shaft 51 secured to the toes 12 relative to the sole 11. This information can be used to lock in the control of the jack 19.

Figure 6:
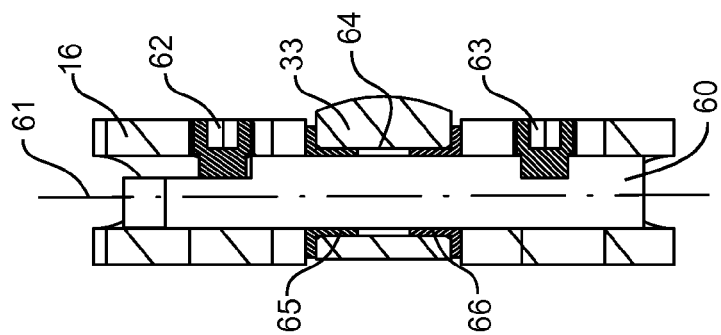
FIG. 6 represents the articulation of the toes relative to the jack.

FIG. 6 shows the joint of the toes 12 relative to the jack 19. This joint can also be produced like the two previous articulations. The end 16 of the toes 12 has the shape of a fork in which a shaft 60 of axis 61 is attached by means of screws 62 and 63. The shaft 60 can pivot in a bore 64 of the yoke 33. It is possible to place bearings 65 and 66 between the bore 64 and the shaft 60 to reduce the friction when the shaft 60 rotates in the bore 64.

The invention claimed is:

1. A foot for a humanoid robot, that can be connected to a leg by means of an ankle, the foot comprising:
a sole having an upright secured thereto;
toes;
a connection, independent of the ankle, in rotation between the sole and the toes, the toes being able to move on an angular travel about an axis of the connection;
an actuator formed of a linear jack coupled to the upright and the toes, allowing the connection to be motorized; and
means for controlling the actuator in a standalone manner, wherein the means for controlling the actuator makes it possible to choose a state from one of:
a complete rigidity of the connection;
a restoring torque that is a function of the angular travel of the connection;
a damping of the rotation of the connection; and
an addition of power during the rotation of the connection.

2. The foot as claimed in claim 1, wherein the connection allows a rotation of the toes relative to the sole in a sagittal plane of the foot.

3. The foot as claimed in claim 1, wherein the jack makes a movement on an axis contained in a sagittal plane of the foot.

4. The foot as claimed in claim 3, wherein, when the toes are aligned with the sole, the axis of the jack is inclined relative to a main plane of the sole to allow the toes to be lowered beneath the main plane of the sole.

5. The foot as claimed in claim 4, wherein an end of the jack is coupled to the upright above the main plane to always maintain an angle of convergence between the axis of the jack and a toe axis defined between the connection and a point where an opposite end of the jack is coupled to the toes.

6. The foot as claimed in claim 1, wherein the jack is electric or hydraulic.

7. The foot as claimed in claim 1, wherein the jack is a double-acting jack making it possible to lower or to raise the toes.

8. The foot as claimed in claim 1, wherein the jack is a single-acting jack designed to push on the toes so as to lower them.

9. A humanoid robot, comprising at least one foot as claimed in claim 1.

* * * * *

UNITED STATES PATENT AND TRADEMARK OFFICE
CERTIFICATE OF CORRECTION

PATENT NO.        : 8,403,081 B2                                                        Page 1 of 1
APPLICATION NO.   : 12/996474
DATED             : March 26, 2013
INVENTOR(S)       : Alfayad et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 21 days.

Signed and Sealed this
First Day of September, 2015

Michelle K. Lee
*Director of the United States Patent and Trademark Office*